July 9, 1940.  F. J. KURTH  2,207,201
AIR DISTRIBUTING DEVICE
Filed Aug. 9, 1938
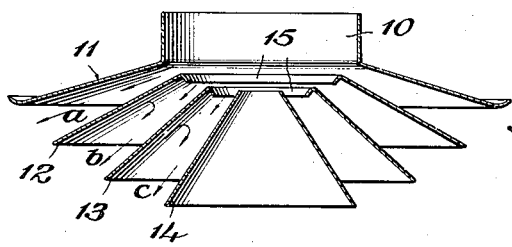
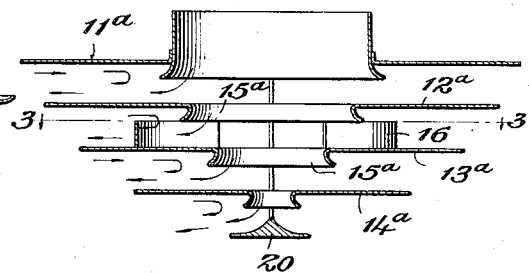
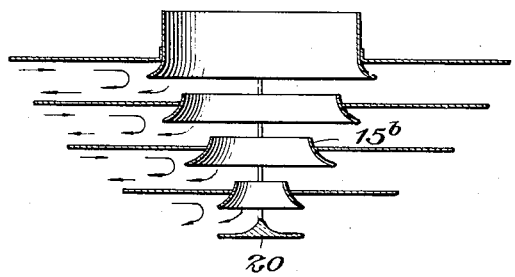
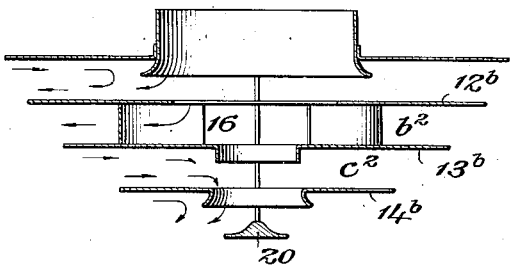
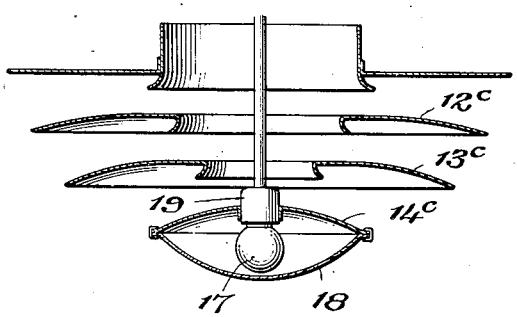
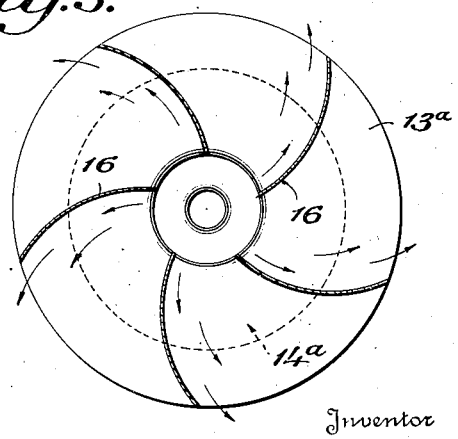
Inventor
Franz J. Kurth,
By Alfred Muller
Attorney Patented July 9, 1940

2,207,201

UNITED STATES PATENT OFFICE 2,207,201

AIR DISTRIBUTING DEVICE

Franz J. Kurth, New York, N. Y., assignor to Anemostat Corporation of America, a corporation of Delaware Application August 9, 1938, Serial No. 223,815

8 Claims. (Cl. 98—40)

This invention relates to air diffusing or distributing devices, and has particular reference to air diffusing or distributing devices of the general type comprising a plurality of either flat or flaring members disposed successively in advance of one another and respectively having central openings of decreasing size, whereby air supplied through said openings is caused to be distributed substantially draftlessly in separate streams through passageways between said members.

The general object of the present invention is to provide, in a device of the general type mentioned, flanges or lips around the central openings in some or all of the members to cause the air supplied through the device to produce either a recirculation flow of air in some or all of the air distributing passageways, or solely an outward flow of air through one or more of said passageways and solely an inward flow of air through one or more other of said passageways, or solely an inward flow of air through one or more of said passageways and a recirculation flow of air through one or more other of said passageways, whereby there is produced within the device and in the immediate vicinity thereof, an effective mixing of the supplied air with the air of the room or other enclosure into which the supplied air is delivered. In that connection, the present application, in its broader aspects, is a division of my prior application Serial No. 127,341. At the same time, the present application represents a carrying forward of the invention disclosed in my aforesaid prior application respecting the provision of lips or flanges around the central openings in the members to obtain more effective mixing of the supplied air with the air of the room or other enclosure into which the supplied air is delivered.

Another special object of the invention is to provide, in a device of the general type mentioned, novel means to cause the air to be delivered helically from the device, whereby the air is most effectively distributed.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the accompanying drawing:

Figure 1 is a central, longitudinal section through an air diffusing or distributing device constructed in accordance with one practical embodiment of the invention; and Figure 2 is a view similar to Fig. 1 illustrating an alternative embodiment of the invention.

Figure 3 is a cross section on the line 3—3 of Fig. 2; and

Figures 4, 5 and 6 are views similar to Fig. 1 illustrating other alternative embodiments of the invention.

Referring to the drawing in detail, first with particular reference to the embodiment of the invention illustrated in Fig. 1, it will be observed that the device comprises a plurality of successively smaller, open-ended, hollow, flaring members disposed in mutually spaced relationship in advance of one another to provide a series of separate, flaring passageways therebetween, whereby air supplied to the device through a supply duct connected with the smaller or rear end of the largest member, is divided into a plurality of separate streams and thereby is delivered substantially draftlessly forwardly and laterally of the device. The air supply duct is designated as 10, the successively smaller flaring members, of which four are illustrated in the present instance, are designated as 11, 12, 13 and 14, respectively, and the successively forwardly disposed passageways between said members are designated as $a$, $b$ and $c$, respectively. As will be understood, the flaring members may be of circular or of any other desired shape in plan. Also, it will be understood that the openings in the rear ends of said flaring members need not be successively smaller as shown. On the contrary, the opening in the rear end of one or more of said members may be smaller than the opening in the rear end of one or more of the members that is, or are, disposed in advance of said first mentioned member, or members, whereby, in accordance with known practice, air is directed across the inner end of one or more of the passageways to thereby produce a suction effect and an inward flow of air through such passageway, or passageways, and a mixing within the device of the supplied air with the air of the room or other enclosure into which the supplied air is delivered. In any event, in accordance with the present invention, one or more of the flaring members is, or are, provided at its, or their rear end, or ends, with a forwardly and preferably inwardly directed flange 15 extending partly across the mouth or inner end of the related passageway, or passageways. Thus, instead of the supplied air flowing only outwardly through the passageways, it is baffled by the flange, or flanges, 15 against outward flow through the rear portion of one or more of said passageways and, consequently, flows outwardly only through the forward portion, or portions, of such passageway, or passageways. The result is that in the rear portion, or portions, of such passageway, or passageways, there is produced a lower than atmospheric pressure which results, in turn, in air flowing inwardly through the rear portion, or portions, of such passageway, or passageways. This inwardly flowing air is, of course, picked up by and carried outwardly by the outwardly flowing air. Consequently, there is effected within such passageway, or passageways, an advantageous mixing of the supplied air with the air of the room or other enclosure into which the supplied air is delivered. As will be understood, the flanges 15 may be formed integrally with the flaring members, or may be formed separately from said flaring members and may be fastened thereto in any suitable manner.

Instead of the members comprising the device being flared, they may be in the form of flat disks. This is illustrated in Fig. 2 of the drawing, wherein the members, of flat disk form, are designated as 11ª, 12ª, 13ª and 14ª. This figure also illustrates that the air baffle flanges, designated as 15ª, may extend forwardly and outwardly instead of forwardly and inwardly, as in the Fig. 1 construction, and that the air supply duct, designated as 10ª, may have its forward end portion extending into the first or rearmost passageway in the form of an air baffling flange to cause a recirculation flow of air in said rearmost passageway. Figures 2 and 3 further indicate that vanes 16, preferably helically curved, may be provided in any one or more of the air distributing passageways of the device, in the path of the outwardly flowing air, to cause the supplied air to be delivered substantially tangentially from the device, thereby to further assist in causing its thorough inter-mixture with the air of the room or other enclosure into which it is delivered. The vanes 16 may extend entirely across the air distributing passageways, or only across the forward portions of said passageways. In the latter case they do not interfere with free inward flow of air in the rear portions of the passageways.

Figure 4 illustrates a form of the invention which is in all respects similar to the Fig. 2 form of the invention, except that the air baffling flanges, designated as 15ᵇ, are extended rearwardly of the respective disk-like members comprising the device. Obviously, the rearwardly extending portions of said flanges, which preferably are also curved outwardly, serve to intercept the supplied air and to assist in directing it outwardly through the forward portions of the air distributing passageways.

Figure 5 illustrates a form of the invention in which one of the disks, 12ᵇ, of the device is devoid of an air baffling flange and in which the central opening in another of the disks 13ᵇ, is smaller than the central opening in the disk 14ᵇ next adjacent to and forwardly thereof. Accordingly, the supplied air flows only outwardly through the passageway b² in front of the disk 12ᵇ, and does not flow at all outwardly through the passageway c² in front of the disk 13ᵇ. On the contrary, the supplied air flows across the mouth of the passageway c² and thereby produces a suction effect in said passageway, with the result that air flows only inwardly therethrough and becomes mixed within the device with the supplied air. Figure 5 further illustrates vanes 16ᵇ in the passageway b² extending entirely across said passageway as and for the same purpose as the vanes 16 in the Figs. 2 and 3 embodiment of the invention.

Figure 6 illustrates an embodiment of the invention in all respects similar to the Fig. 2 embodiment of the invention, except that the disks 12ᶜ, 13ᶜ and 14ᶜ have their marginal portions curved forwardly to cause the supplied air to be delivered forwardly as well as laterally from the device. This figure also illustrates illuminating means in the form of an electric lamp 17 disposed forwardly of the disk 14ᶜ within a globe 18 supported by said disk, the socket 19 for said lamp being mounted in said disk 14ᶜ centrally thereof. Alternatively, the lamp 17 may be mounted at any suitable point interiorly of the device as is apparent.

According to each of the forms of the invention illustrated in Figs. 2, 4 and 5, an air deflecting element 20 is disposed in front of the central opening in the forward member.

Obviously, the various different features of any of the different established forms of the invention may be combined in various different ways in various other different forms of the invention.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. An air distributing device comprising a plurality of members having central openings and disposed successively forwardly of one another so as to provide air distributing passageways therebetween, certain of said members having portions thereof disposed laterally inward of the edges of the openings in the next adjacent rearwardly disposed members, respectively, whereby supplied air delivered forwardly through the openings in said members is directed laterally outward through certain of said passageways, and an air baffling flange extending forwardly from at least one of said members adjacent to the central opening therein and partly across the passageway in front thereof to prevent supplied air from flowing outwardly through the rear portion of said passageway, whereby supplied air flowing outwardly through the forward portion of said passageway causes an inward flow of air through the rear portion of said passageway and a mixing within said passageway of the outwardly and inwardly flowing air.

2. An air distributing device comprising a plurality of members having central openings and disposed successively forwardly of one another so as to provide air distributing passageways therebetween, certain of said members having portions thereof disposed laterally inward of the edges of the openings in the next adjacent rearwardly disposed members, respectively, whereby supplied air delivered forwardly through the openings in said members is directed laterally outward through certain of said passageways, and curved vanes between certain of said members for causing supplied air flowing through said passageways to be delivered from the device substantially tangentially with respect thereto.

3. An air distributing device comprising a plurality of members having central openings and disposed successively forwardly of one another so as to provide air distributing passageways therebetween, certain of said members having portions thereof disposed laterally inward of the edges of the openings in the next adjacent rearwardly disposed members, respectively, whereby supplied air delivered forwardly through the openings in said members is directed laterally outward through certain of said passageways, an air baffling flange extending forwardly from at least one of said members adjacent to the central opening therein and partly across the passageway in front of said member, and curved vanes extending rearwardly from the next adjacent forwardly disposed member partly across said passageway.

4. An air distributing device as set forth in claim 1 in which the members are of flaring form.

5. An air distributing device as set forth in claim 1 in which the members are of flat disk form.

6. An air distributing device as set forth in claim 1 in which the members are of substantially flat disk form having forwardly curved marginal portions.

7. In an air distributing device as set forth in claim 1, an air supply duct connected with the rearmost member to deliver air through the central opening in said member, and an air baffling flange adjacent to said central opening and extending forwardly into the passageway directly in front of said member partly across said passageway.

8. In an air distributing device, a member having an opening for flow of air forwardly therethrough, means forwardly of and spaced from said member and cooperating therewith to provide an air passageway extending laterally outward relative to the axis of said opening, said means being effective to deflect air supplied through said opening laterally outward into said passageway, and an air baffling flange extending forwardly from said member adjacent to the opening therein and partly across said passageway to prevent supplied air from flowing outwardly through the rear portion of said passageway, whereby supplied air flowing outwardly through the forward portion of said passageway causes an inward flow of air through the rear portion of said passageway and a mixing within said passageway of the outwardly and inwardly flowing air.

FRANZ J. KURTH.